May 1, 1928.
A. OSOLIN
1,668,376
FLUID MEASURING AND DISPENSING APPARATUS
Filed Nov. 10. 1926
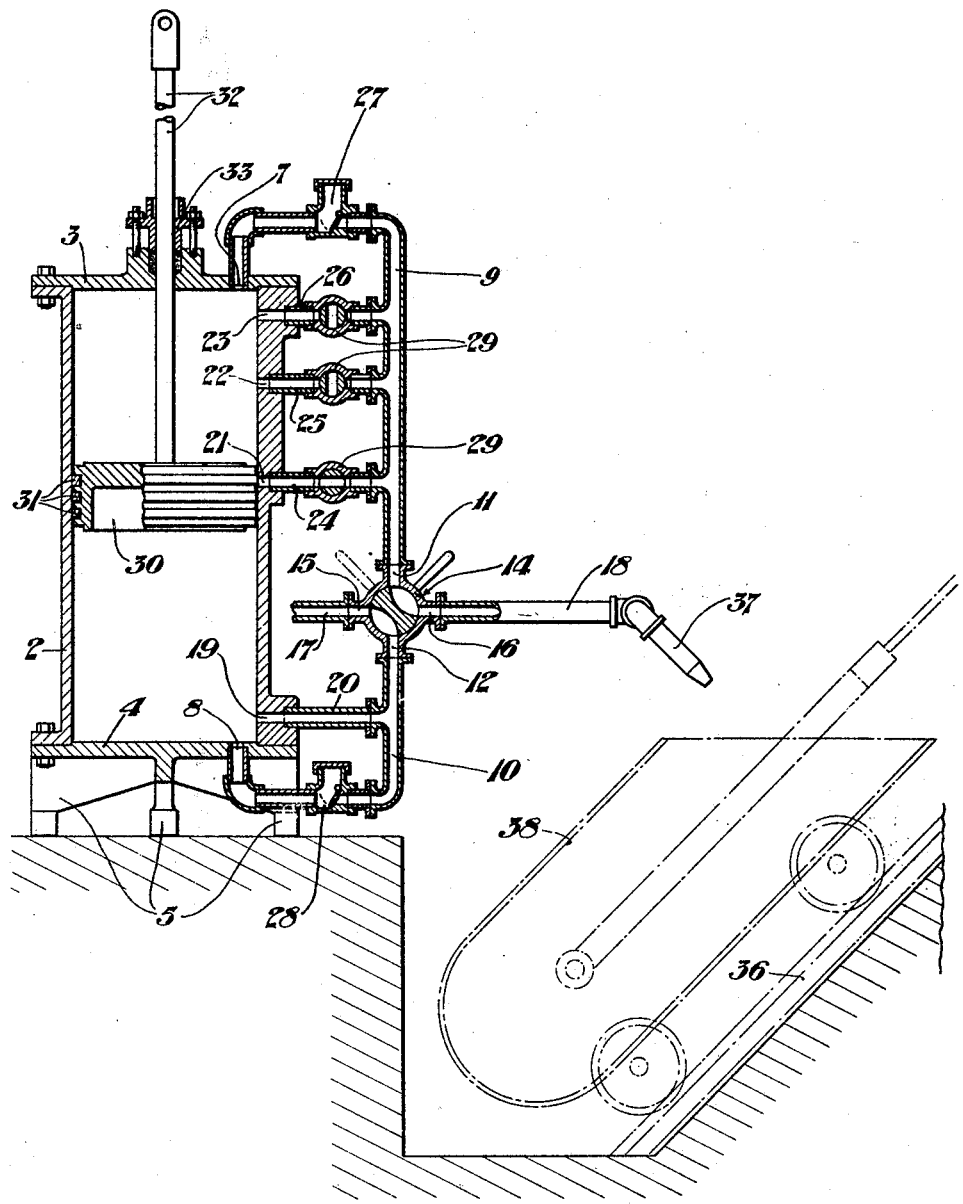
Witnesses:
Edwin Trueb
Inventor:
ALFRED OSOLIN,
by D'Anthony Usina
his Attorney.

Patented May 1, 1928.

1,668,376

UNITED STATES PATENT OFFICE.

ALFRED OSOLIN, OF CLEVELAND, OHIO.

FLUID MEASURING AND DISPENSING APPARATUS.

Application filed November 10, 1926. Serial No. 147,486.

This invention relates to a fluid measuring and dispensing apparatus, and has for one of its objects the provision of such an apparatus that is particularly adapted for wetting blast furnace stock and for other uses around a steel mill, since due to its being composed of few parts it will be less likely to get out of order than other apparatus of this character.

Another object is to provide an apparatus of this character which will be continuous in operation; that is, an apparatus that immediately after the dispensing of one measured quantity of fluid will be in readiness to dispense another like measured quantity without waiting for the fluid to flow into the apparatus.

A further object is to provide an apparatus of this character with means for varying the quantity of fluid dispensed.

A further object is to provide a novel arrangement of parts whereby a fluid cushion will be formed by the balancing of fluid pressure on each side of the plunger of the device to automatically stop the operation of the apparatus, thereby preventing jerking or jarring of the parts.

A still further object is to provide an apparatus of this character having the novel construction, design and combination of parts hereinafter described and illustrated in the accompanying drawings.

In the drawings—

The figure is a sectional side elevation of an apparatus constructed in accordance with this invention.

Referring more particularly to the drawings, the numeral 2 designates the body portion or cylinder of my improved measuring and dispensing apparatus. The cylinder 2 is provided with closed ends 3 and 4, and the lower end 4 is provided with leg portions 5.

The ends 3 and 4 are provided with inlet ports 7 and 8, respectively, which are connected by main pipes or conduits 9 and 10 respectively, to separate ports 11 and 12 in a four-way valve 14.

The other ports 15 and 16 of the valve 14 are connected to a fluid supply pipe 17, and a dispensing pipe 18 respectively.

An outlet port 19 is provided in the side wall of the cylinder adjacent the lower end 4 and is connected by a branch pipe or conduit 20 with the conduit 10.

A series of other outlet ports 21, 22 and 23 are formed in the side wall of the cylinder and are spaced one above the other. The ports 21, 22 and 23 are connected by branch pipes or conduits 24, 25 and 26, respectively, with the main conduit 9.

The main conduits 9 and 10 are provided with check valves 27 and 28, respectively, adjacent the inlet ports 7 and 8 so as to prevent the back flow or outflow of fluid through the inlet ports 7 and 8.

The branch conduits 24, 25 and 26 are each provided with a shut-off valve 29 to control the flow of fluid therethrough.

Rotation of the four-way valve 14 is adapted to alternately connect the ports 15 and 16 of the valve with the ports 11 and 12, so as to alternately connect the supply pipe 17 with the inlet ports 7 and 8 and alternately connect the main conduits 9 and 10 with the dispensing pipe 18.

A plunger 30 is mounted in the cylinder 2 and has a fluid-tight fit with the cylinder walls due to packing rings 31. The plunger 30 is adapted to reciprocate within the cylinder and is provided with a guide rod 32 which projects up through a stuffing box 33 in the upper end 3 of the cylinder.

In operation, the fluid enters through one of the ports 7 or 8, according to the position of the valve 14, and forces the plunger 30 toward the other end of the cylinder, uncovering the outlet port adjacent the active inlet port and permitting the fluid to enter both the inlet port and the uncovered outlet port. The plunger will continue its movement away from the active inlet port until it moves over the open outlet port adjacent the other end of the cylinder. As the plunger moves over the outlet port through which the fluid is being discharged from the cylinder it will gradually close said port so as to slow down the discharge of fluid so as to slow down the movement of the plunger until the plunger is stopped due to the balance of fluid pressure on both sides of the plunger.

The stroke of the plunger 30 can be readily varied by opening selected ones of the valves 29 in the outlet branch conduits 24, 25 and 26.

By reversing the four-way valve 14, the fluid will enter the opposite end of the cylinder and will reverse the movement of the plunger 30, thereby discharging fluid from the open discharge or outlet port adjacent the other end of the cylinder.

This apparatus may be used wherever it is desirous to dispense measured quantities of fluid, although it was primarily devised for dispensing measured quantities of water onto blast furnace stock.

When the apparatus is used for wetting blast furnace stock, it will preferably be mounted adjacent the lower end of the skip-hoist 36, with its dispensing pipe provided with a nozzle 37 and arranged to discharge onto the stock loaded in the skip-car 38.

While I have shown and described one specific embodiment of my invention, it will be expressly understood that I do not wish to be limited thereto, since various modifications may be made without departing from the scope of my invention as defined in the appended claims.

I claim:

1. A fluid measuring and dispensing device comprising a cylinder, a plunger mounted for reciprocatory movement in said cylinder, a fluid inlet port in each end of said cylinder, check valves for preventing the outflow of fluid from said cylinder through said inlet ports, an outlet port in the side wall of said cylinder adjacent the lower end thereof, and a series of vertically spaced valved outlet ports in the side wall of said cylinder above said first named outlet port, said inlet ports being alternately connected with a source of fluid supply, the pressure of the inflowing fluid forcing said plunger toward the opposite end of said cylinder so as to expel the fluid from in front of said plunger through the open outlet port adjacent said opposite end, said plunger moving over and closing said outlet port as it is moved forward in said cylinder and the movement of said plunger being adapted to automatically stop when the fluid pressure is balanced on each side of said plunger, selected ones of said series of outlet ports being opened to vary the effective capacity of said cylinder.

2. A fluid measuring and dispensing mechanism comprising a cylinder, a plunger mounted for reciprocatory movement in said cylinder, an inlet port in each end of said cylinder, main conduits connecting said ports to a four-way valve, check valves in said conduits at points adjacent said inlet ports to prevent the outflow of fluid from said cylinder, a fluid supply pipe and a dispensing pipe, also connected to said four-way valve, an outlet port in the side wall of said cylinder adjacent the lower end thereof, a branch conduit connecting said outlet port with the main conduit connecting the inlet port in the lower end of said cylinder with said four-way valve, a series of other outlet ports in the side wall of said cylinder adjacent the upper end thereof and spaced one above the other, branch conduits connecting each of said last named outlet ports with the main conduit connecting the inlet port in the upper end of said cylinder with said four-way valve, shut-off valves in each of said last named branch conduits, said four-way valve being operable to alternately connect said main conduits with said delivery and supply pipes, the pressure of the inflowing fluid from said supply pipe entering the respective ends of said cylinder forcing said plunger towards the opposite end so as to expel the fluid from in front of said plunger through the open outlet port adjacent said opposite end, said plunger closing said outlet port as it is moved forward by the inflowing fluid and being automatically stopped when the pressure is balanced on each side of said plunger, selected ones of said series of spaced outlet ports being opened to vary the effective capacity of said cylinder.

In witness whereof I have hereunto signed my name.

ALFRED OSOLIN.